United States Patent [19]
La Flame

[11] 3,727,735
[45] Apr. 17, 1973

[54] VISCOUS FLUID CLUTCH

[75] Inventor: Frank E. La Flame, Dayton, Ohio

[73] Assignee: General Motors Corporation, Detroit, Mich.

[22] Filed: June 10, 1971

[21] Appl. No.: 151,872

[52] U.S. Cl..............192/58 B, 192/82 T, 123/41.12
[51] Int. Cl..............................................F16d 35/00
[58] Field of Search................192/58 A, 58 B, 82 R, 192/82 T; 123/41.12

[56] References Cited

UNITED STATES PATENTS

| | | | |
|---|---|---|---|
| 3,059,745 | 10/1962 | Tauschek | 192/82 T X |
| 2,988,188 | 6/1961 | Tauschek | 192/82 T X |
| 3,088,566 | 5/1963 | Fleming | 192/58 A |
| 3,323,623 | 6/1967 | Roper | 192/58 B |

*Primary Examiner*—Allan D. Herrmann
*Attorney*—Warren E. Finken, A. M. Heiter and John P. Moran

[57] ABSTRACT

A viscous fluid clutch including relatively rotatable first and second drive members having fluid shear spaces therebetween which are cooperable with a predetermined volume of a fluid medium in the shear spaces to provide a resultant variable speed differential between the first and second members, and a separately located circular tubular reservoir member with at least one conduit communicating between the tubular reservoir chamber thereof and the outer peripheral portions of the fluid shear spaces. Expansion and contraction of the fluid medium, resulting from changes in ambient temperature around the circular tubular reservoir member, cause the annular level of the fluid medium in the shear spaces to vary, thus varying the speed of an associated cooling fan. To supplement the expansion and contraction characteristics of the usual silicone fluid, other fluids or materials, such as a refrigerant, a wax, or polypropylene, may be contained in the tubular reservoir chamber.

9 Claims, 7 Drawing Figures

PATENTED APR 17 1973 3,727,735
SHEET 1 OF 2
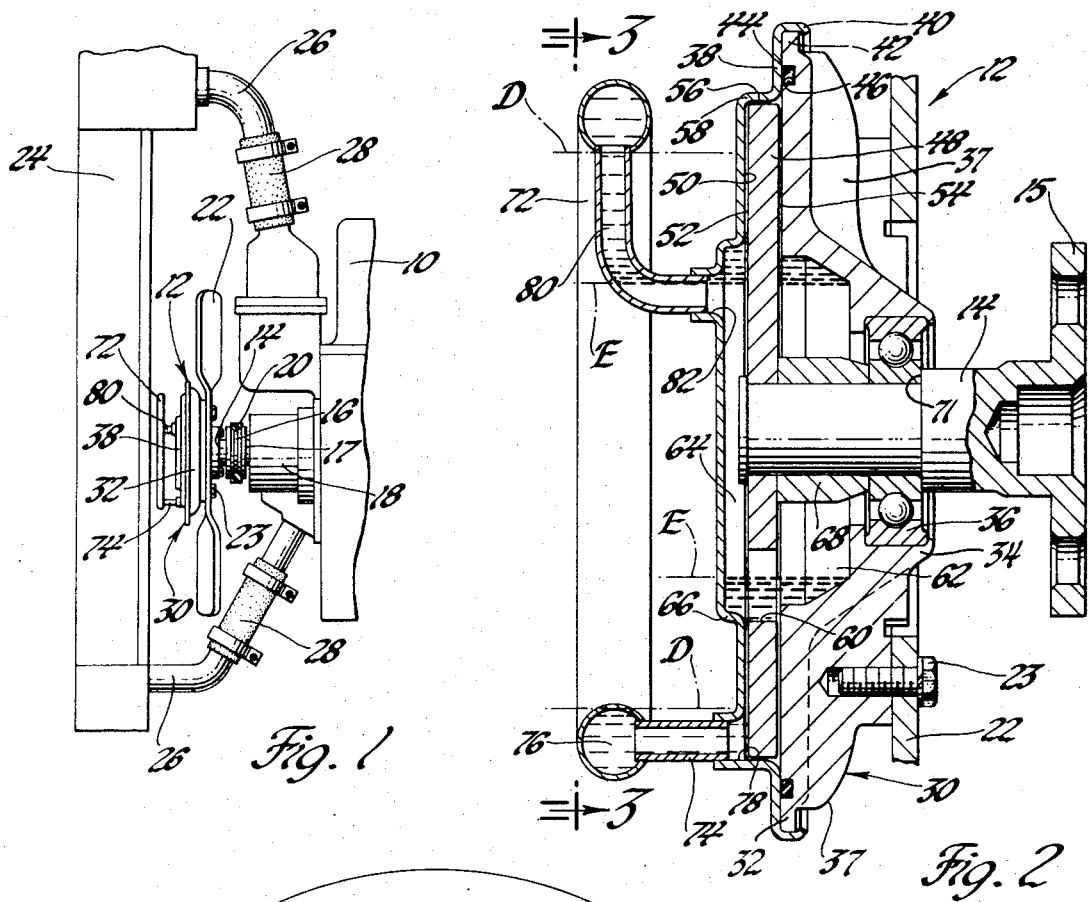
Fig. 1
Fig. 2
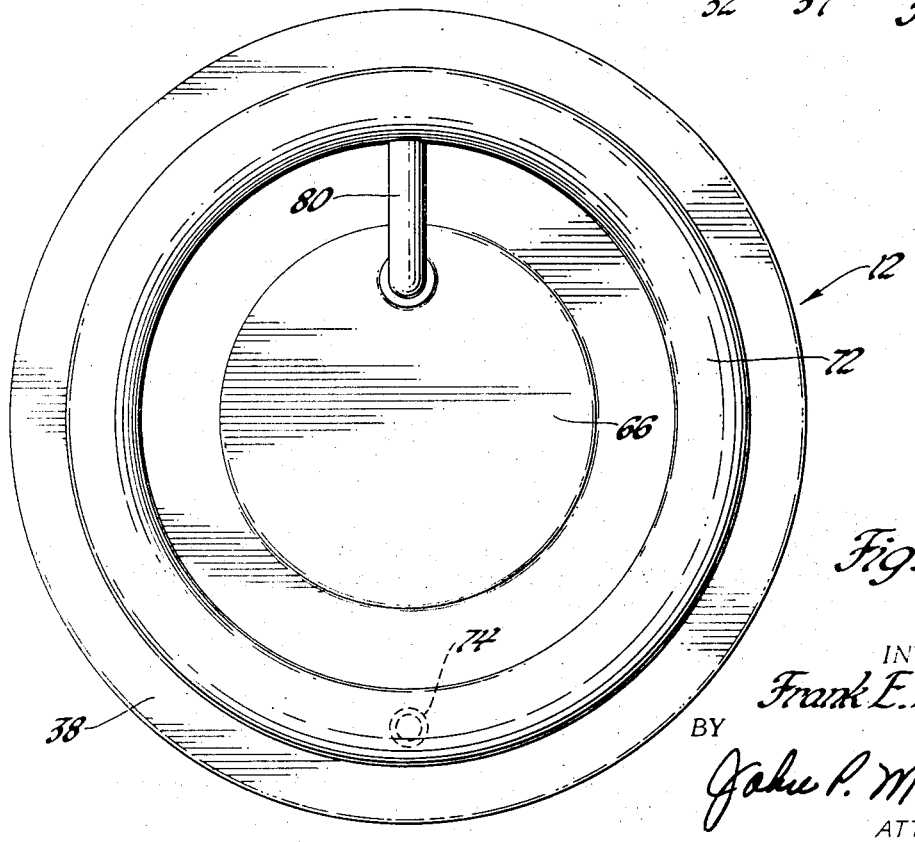
Fig. 3
INVENTOR.
Frank E. LaFlame
BY
John P. Moran
ATTORNEY INVENTOR.
Frank E. LaFlame
BY
John P. Moran
ATTORNEY

VISCOUS FLUID CLUTCH

This invention relates generally to variable speed drive devices and, more particularly, to a viscous fluid drive adapted to drive an accessory device, such as a cooling fan, for an internal combustion engine.

Vehicle cooling fans are generally belt-driven from the engine crankshaft, and are operable at a fixed speed ratio with respect to the vehicle engine. It has been found desirable to vary the speed ratio of the fan with respect to the engine speed so that at low engine speed the fan will be running at a relatively high speed for maximum cooling and as the speed of the engine increases, such as when the vehicle is running in direct drive at road speeds, the ram air cooling effect on the engine is increased and the necessity for fan cooling is diminished. The resultant lower fan speed eliminates excessive fan noise which otherwise could be disturbing to the occupants of the vehicle.

The device disclosed herein relates to an engine cooling fan mechanism wherein a viscous fluid, shear-type clutch is utilized to transmit power from the vehicle engine to the fan blade assembly.

A primary object of the invention is to provide a viscous fluid clutch with efficient, simplified means for varying the fluid shear drive between adjacent relatively rotatable drive members.

Another object of the invention is to provide a viscous fluid clutch with means wherein the expansion and contraction of the usual fluid medium, in response to changes in ambient temperature, is utilized to very the relative speeds of adjacent drive members.

A further object of the invention is to provide additional fluid means for supplementing the expansion and contraction effect of the usual silicone fluid to vary the relative speeds of adjacent drive members.

A still further object of the invention is to provide a viscous fluid clutch including a circular tubular reservoir member containing one or more fluid media and having conduitry means extending therefrom for communicating one of the fluid media to the outer peripheral portion of the fluid shear spaces between relatively rotatable members, the fluid medium within the tubular reservoir member being caused to expand and contract in response to changes in ambient temperature to thus vary the annular fluid level in the shear spaces and thereby vary the rotatable speed of the driven member with respect to the driving member.

These and other objects and advantages of the invention will become apparent when reference is made to the following description and accompanying drawings, wherein:

FIG. 1 is a fragmentary side elevational view of a radiator and engine having a viscous fluid clutch-driven cooling fan associated therewith;

FIG. 2 is an enlarged cross-sectional view of a viscous fluid, shear-type clutch embodying the invention;

FIG. 3 is an end view taken on the plane of line 3—3 of FIG. 2, as if FIG. 2 were a complete and full round view, and looking in the direction of the arrows;

Figure 4:
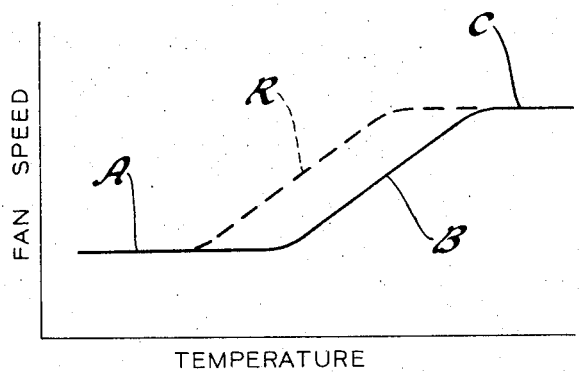
FIGS. 4 and 7 are graphs illustrating characteristics of the invention.

Referring to the drawings in greater detail, FIGS. 1 and 2 illustrate an engine 10 having a viscous fluid clutch 12 mounted on a drive shaft 14. A flange 15 formed on the shaft 14 serves to mount the clutch 12 on a pulley 16, the latter being secured to a shaft 17 extending from the conventional water pump 18. The pulley 16 is rotated by a V-belt 20 connected to the crankshaft (not shown) for driving a cooling fan 22 secured to the clutch 12 by bolts 23. The fluid clutch 12 and the cooling fan 22 are located between the engine 10 and a radiator 24. The usual conduits 26 and associated hoses 28 communicate between the radiator 24 and the engine 10 adjacent the water pump 18.

Referring now to FIG. 2, the fluid clutch 12 includes a housing 30 which includes a rear wall member 32 having a hub 34 which is rotatably mounted by a suitable bearing 36 on the drive shaft 14. Suitable fins 37 may be formed on the rear wall member 32. The housing 30 further includes a cover member or front wall 38 which is secured by an annular lip 40 around an outer peripheral collar portion 42 of the rear wall member 32. A seal 44 is compressed in an annular groove 46 formed in the rear wall member 32 adjacent the inner surface of the cover member 38.

A clutch plate 48 is secured at its center by any suitable means to the drive shaft 14, the outer peripheral portion thereof being freely located in an operating or working chamber 50, formed between the rear wall member 32 and the cover member 38 such that a pair of fluid shear spaces 52 and 54 are provided between the clutch plate 48 and the adjacent cover and rear wall member surfaces to accommodate a viscous silicone fluid as a torque-transmitting medium. A predetermined clearance or peripheral shear space 56 is provided between the outer peripheral surface of the clutch plate 48 and an adjacent cylindrical step or bend portion 58 of the cover member 38.

A plurality of equally spaced openings 60 are formed through the clutch plate 48 comminicating between a chamber 62 formed in the rear wall member 32 adjacent the bearing 36 and an oppositely disposed chamber 64 formed by a second stepped portion 66 of the cover member 38. A sleeve member 68 is mounted around the shaft 14 intermediate the clutch plate 48 and the bearing 36. The sleeve member 68 and the bearing 36 are confined between the clutch plate 48 and a shoulder 71 formed on the shaft 14.

A circular tubular reservoir member 72 is spaced apart from the outer surface of the cover member 38. A conduit 74 communicates silicone fluid between the reservoir chamber 76 formed by the circular tubular reservoir member 72 and the outer peripheral portion of the working chamber 50 via an opening 78 formed in the cover member 38, the intermediate air providing a means of insulating the member 72 from the heat of the housing 30. An arcuate-shaped conduit 80 communicates between the reservoir chamber 76 formed by the circular tubular reservoir member 72 and the chamber 64 via an opening 82 formed in the cover member 38 radially inwardly of the fluid shear space 52. It may be noted that no pumping or valving provisions are included in conjunction with the movement of fluid through the passages 74/78 and 80/82.

Operation

So long as the vehicle engine 10 (FIG. 1) is in operation, the drive shaft 14 and the associated clutch plate 48 (FIG. 2) will be driven by the pulley 16 operatively connected via the belt 20 to the crankshaft (not shown), at an appropriate speed ratio with respect to engine speed. After start-up and while the engine is cold, the predetermined volume of fluid in the tubular reservoir chamber 76 and in the outer peripheral portion of the working chamber 50 is such that the annular level of the fluid in the shear spaces 52 and 54, under the action of centrifugal force, is substantially at the level designated by the line "D" (FIG. 2). This represents the "disengaged mode," or the level at which the slip-speed between the clutch plate 48 and the housing members 32 and 38 will be the greatest. The fan speed vs. ambient temperature curve for such disengaged mode is illustrated generally as curve "A" of FIG. 4.

As the ambient temperature progressively increases, the conventional silicone fluid commonly used to effectuate a viscous shear drive will begin to expand. Inasmuch as the shear spaces 52 and 54 are maintained at a very close clearance, say, 0.002/0.008 inch, with respect to the adjacent rear wall 32 and the cover member 38, the expanding fluid will begin filling the shear spaces 52 and 54 radially inwardly, moving toward the annular "engaged mode" level "E" (FIG. 2) at a relatively rapid rate with increased ambient temperature. During such expansion, fan speed will progressively increase with increased temperature substantially as illustrated by curve "B" of FIG. 4.

Prior to the attainment of the annular level "E," the expanding fluid will have flowed through the openings 60, equalizing the level in both shear spaces 52 and 54. With the fluid fully expanded radially inwardly past the innermost portions of the shear spaces 52 and 54 and maintained under the action of centrifugal force at some annular level "E," maximum fan speed will have been attained and will thereafter remain constant with increased temperature, as illustrated by curve "C" of FIG. 4. It should be understood that the fan speed levels "A" and "C" will vary somewhat with different engine 10 input speeds.

Any decrease in ambient temperature thereafter around the tubular reservoir member 72 will cause the fluid in the reservoir chamber 76 to contract and, under the action of centrifugal force, the fluid in the chambers 62 and 64 and the shear spaces 52 and 54 will move radially outwardly toward the abovementioned annular level "D," maintaining the reservoir chamber 76 full via the straight interconnecting conduit 74. During such retraction of the fluid from the radially innermost portions of the shear spaces 52 and 54, outwardly of the level "E," to the level "D," the fan speed will progressively decrease substantially as represented by curve "R" of FIG. 4, as compared to the increasing fan speed curve "B," due to a conventional hysteresis effect.

Should any air tend to become entrapped in the reservoir chamber 76, it will be pushed by the fluid therein into the arcuate-shaped conduit 80 (FIG. 2), and thence into the chamber 64.

Figure 5:
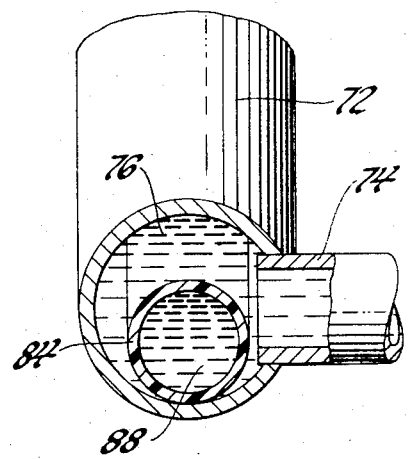
FIGS. 5 and 6 are fragmentary views illustrating alternate embodiments of a portion of the FIG. 2 structure.
Figure 6:
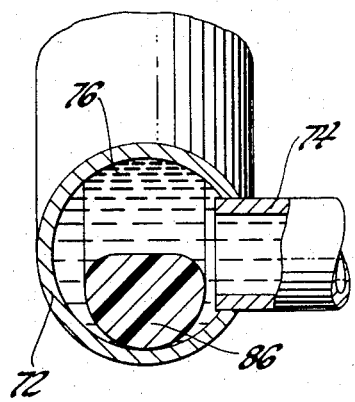

If desired, the rate of fan speed variation with change in temperature and the resultant expansion and contraction of the conventional silicone fluid may be supplemented by the inclusion within the reservoir chamber 76 of a formed member 84 or 86, illustrated in FIGS. 5 and 6, respectively, preferably an annular member conforming to the circular shape of the tubular member 72 and having independent expansion and contraction characteristics. It may be noted that the container member 84 (FIG. 5) is a tubular member of a smaller diameter than the member 72, surrounded by the conventional silicone fluid in the reservoir chamber 76 and, in turn, forms a chamber 88 containing a second suitable fluid medium, such as a refrigerant or a wax, or other material having a higher coefficient of thermal expansion or wherein the volume changes as a result of a change in form, such as from a solid to a liquid or from a liquid to a gas.

Figure 7:
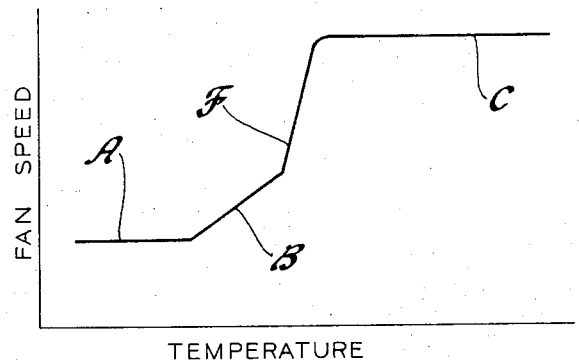

The wall of the member 84 must be flexible, either by being made of a stretchable or extendable material which may be caused to change from a somewhat collapsed condition to a fully filled-out condition, or which may be stretched like rubber or a pleated or fluted material which extends like a bellows, so as to be able to expand and contract as the volume of the fluid in the chamber 88 changes. Thus, the change in shape of the member 84 will supplement the change in volume of the silicone fluid in the chamber 76, with changes in ambient temperature, to change the rate at which the annular fluid level in the shear spaces 52 and 54 varies from the "cold" level "D," thus effecting a change in the curve "B." For example, if a suitable refrigerant or wax were included in the inner enclosed chamber 88, it is conceivable that the curve "B" resulting from the expansion of the silicone fluid could be interrupted by the so-called "flashing" of the refrigerant from a liquid to a gas, or the rapid change of the wax from a solid to a liquid state, causing a rapid expansion of the container member 84 and the fluid in the shear spaces 52 and 54 to effectuate a steep curve portion, such as that represented by curve "F" of FIG. 7, over a relatively short temperature range.

It is apparent that the final level "E" may be changed from that illustrated, depending upon the characteristics of the fluid in the chamber 88, but that fan speed would level off at curve "C" once the fluid level extends radially inwardly past the innermost portions of the shear spaces 52 and 54.

As illustrated in FIG. 6, the member 86 may consist of a suitable solid material, such as polypropylene, which also expands and contracts with changes in ambient temperature around the tubular reservoir member 72, to supplement the expansion and contraction of the conventional silicone fluid in the reservoir chamber 76. If the coefficient of thermal expansion varies from that of the silicone fluid, this also could serve to vary the slope of the curve "B." It may be desirable for the member 86 to comprise a material whose coefficient of thermal expansion is substantially the same as that of the silicone fluid but which is more economical than an equal volume of silicone fluid, thereby retaining substantially the curve "B" characteristics of FIG. 4.

It should now be apparent that the invention provides an improved viscous fluid clutch, wherein conventional bimetallic thermostatic valve arrangements and divider walls are not required. Hence there results a novel, economical and efficient, simplified viscous fluid clutch wherein the shear drive engagement rate may be controlled as required by employing the expansion and contraction of conventional silicone fluid either alone or in conjunction with other expandable substances.

It should be further apparent that the tubular reservoir member could be located directly radially outwardly of the working chamber, perferably exposed on all sides thereof to ambient air so as to not be subjected to heat transferred from the clutch housing, and with one or more radially extending conduits communicating therebetween.

While the invention has been generally shown and described, other modifications thereof are possible.

I claim:

1. A viscous fluid clutch comprising a first drive member including first and second annular walls connected at their outer peripheral portions and providing a working chamber therebetween, a drive shaft extending into said working chamber, a second drive member mounted on said drive shaft in said working chamber intermediate said first and second annular walls and providing a shear drive relationship therewith, annular reservoir means spaced apart from the outer peripheral portion of said working chamber without common wall means therebetween and including a fluid medium, and a pair of oppositely disposed conduits serving to connect said annular reservoir means to said second annular wall of said first drive member and to communicate said fluid medium between said annular reservoir means and said outer peripheral portion of said working chamber for causing said fluid medium to vary its inner annular level in said working chamber on both sides of said second drive member in response to expansion and contraction of said fluid medium due to changes in ambient temperature around said annular reservoir means, thereby varying the torque transmitted between said first and second drive members.

2. A visous fluid clutch comprising first and second relatively rotatable drive members, said first drive member having an annular working chamber formed therein, said second drive member being mounted in said working chamber and providing shear spaces adjacent opposite sides thereof, said shear spaces being operable with a fluid medium to provide a fluid shear drive relationship between said first and second drive members, annular reservoir means located apart from the outer peripheral portion of said shear spaces, said working chamber and said annular reservoir means each having independent wall means, and a pair of conduits connected between said independent wall means and communicating said fluid medium between said outer peripheral portion of said shear spaces and said annular reservoir means for causing said fluid medium to vary its inner annular level in said shear spaces in response to expansion and contraction of said fluid medium due to changes in ambient temperature around said annular reservoir means, thereby varying the speed of said first drive member with respect to the speed of said second drive member.

3. A viscous fluid clutch comprising a first drive member including first and second spaced annular side walls and a peripheral wall connected to the outer peripheral portions of said annular side walls and providing a viscous shear working chamber therein; a second drive member having annular side walls mounted in said working chamber intermediate said first and second annular walls; a facing pair of said annular side walls, one on said first drive member and the other on said second drive member and having viscous shear drive means operative during rotation of said members, when there is a minimum volume of fluid in said working chamber from the outer perimeter thereof to an annular low-fill fluid level providing a maximum speed reduction, when the volume of said fluid in said working chamber is increased to increase the fill-level providing said fluid in an increasing portion of said viscous shear drive means the speed reduction is decreased, and when the volume of said fluid increases to a high-fill fluid level in said working chamber to provide fluid in a maximum portion of said viscous shear drive means a minimum speed reduction is provided; an enclosed compartment providing a reservoir heat-insulated from the first drive member, exposed on all sides to ambient air and filled with said fluid, so the temperature of said fluid in said reservoir is substantially responsive to ambient air temperature and unresponsive to the temperature of said first drive member, and having free passage means having a very small volume compared to said reservoir communicating between said reservoir chamber and said working chamber between the outer periphery and said low-fill fluid level of said working chamber permitting free movement of said fluid between said reservoir and working chambers operative in response to increasing ambient air temperature to cause expansion of said fluid in said reservoir chamber to cause said fluid to move to said working chamber to increase the fluid level from said low-fill fluid level to said high-fill fluid level to change from maximum to minimum speed reduction.

4. A viscous fluid clutch comprising a first drive member including first and second spaced annular side walls and a peripheral wall connected to the outer peripheral portions of said annular side walls and providing a viscous shear working chamber therein; a second drive member having annular side walls mounted in said working chamber intermediate said first and second annular walls; a facing pair of said annular side walls, one on said first drive member and the other on said second drive member and having viscous shear drive means operative during rotation of said members, when there is a minimum volume of fluid in said working chamber from the outer perimeter thereof to an annular low-fill fluid level providing a maximum speed reduction, when the volume of said fluid in said working chamber is increased to increase the fill-level providing said fluid in an increasing portion of said viscous shear drive means the speed reduction is decreased, and when the volume of said fluid increases to a high-fill fluid level in said working chamber to provide fluid in a maximum portion of said viscous shear drive means a minimum speed reduction is provided; an enclosed compartment providing reservoir means separated from said working chamber by an air space and being exposed on all sides to ambient air and filled with said fluid, so the temperature of said fluid in said reservoir means is substantially responsive to ambient air temperature and unresponsive to the temperature of said first drive member, and having free passage means having a very small volume compared to said reservoir means communicating between said reservoir means and said working chamber between the outer periphery and said low-fill fluid level of said working chamber permitting free movement of said fluid between said reservoir means and said working chamber operative in response to increasing ambient air temperature to cause expansion of said fluid in said reservoir means to cause said fluid to move to said working chamber to increase the fluid level from said low-fill fluid level to said high-fill fluid level to change from maximum to minimum speed reduction.

5. A viscous fluid clutch comprising first and second relatively rotatable drive members, said first drive member having an annular working chamber formed therein, said second drive member being mounted in said working chamber and providing shear spaces adjacent opposite sides thereof, said shear spaces being operable with a fluid medium to provide a fluid shear drive relationship between said first and second drive members, at least one opening formed through said second drive member radially inwardly of said shear spaces and providing communication therebetween, an annular tubular member forming a reservoir chamber spaced apart from the outer peripheral portion of said shear spaces, and a plurality of conduits interconnecting said annular tubular member and said first drive member and communicating said fluid medium between said outer peripheral portion of said shear spaces and said reservoir chamber for causing said fluid medium to vary its inner annular level in said shear spaces as a result of expanding and contracting due to changes in ambient temperature around said annular tubular member, thereby varying the speed of said first drive member with respect to the speed of said second drive member.

6. A viscous fluid clutch comprising a first drive member including first and second annular walls connected at their outer peripheral portions and providing a working chamber therebetween, a drive shaft extending into said working chamber, a second drive member mounted on said drive shaft in said working chamber intermediate said first and second annular walls and providing a shear drive relationship therewith, opening means formed through said second drive member communicating between opposite sides thereof, annular reservoir means located apart from the outer peripheral portion of said working chamber and including a circular tubular-shaped chamber containing a fluid medium, and a pair of tubular conduits interconnecting said annular reservoir means and said outer peripheral portion of said working chamber and communicating said fluid medium therebetween for causing said fluid medium to vary its volume and thus its inner annular level in said working chamber in response to changes in ambient temperature around said tubular reservoir means, thereby varying the torque transmitted between said first and second drive members.

7. A vicous fluid clutch comprising a first drive member including first and second annular walls connected at their outer peripheral portions and providing a working chamber therebetween, a drive shaft extending into said working chamber, a second drive member mounted on said drive shaft in said working chamber intermediate said first and second annular walls and providing a shear drive relationship therewith, an annular tubular reservoir member located exterior the outer peripheral portion of said working chamber, first conduitry means communicating between said annular tubular reservoir member and said outer peripheral portion of said working chamber for causing the fluid medium to vary its volume and thus its inner annular level in said working chamber in response to changes in ambient temperature around said annular tubular reservoir member, thereby varying the torque transmitted between said first and second drive members, and second conduitry means communicating between said annular tubular reservoir member and a radially inner portion of said working chamber for causing any air tending to become trapped in said annular tubular reservoir member to escape to said radially inner portion of said working chamber.

8. A viscous fluid clutch comprising first and second relatively rotatable drive members, said first drive member having an annular working chamber formed therein, said second drive member being mounted in said working chamber and providing shear spaces adjacent opposite sides thereof, said shear spaces being operable with a fluid medium to provide a fluid shear drive relationship between said first and second drive members, a first annular tubular member forming a first reservoir chamber apart from the outer peripheral portion of said shear spaces, a conduit connected between said first annular tubular member and said first drive member for supporting said first annular tubular member and for communicating said fluid medium between said outer peripheral portion of said shear spaces and said first reservoir chamber for causing said fluid medium to vary its inner annular level in said shear spaces as a result of expanding and contracting due to changes in ambient temperature around said first annular tubular member, thereby varying the speed of said first drive member with respect to the speed of said second drive member, and a second smaller annular tubular member mounted within said first reservoir chamber and forming a second reservoir chamber containing a second fluid medium for expanding and contracting in response to changes in said ambient temperature to further vary the variation of said inner annular level of said first-mentioned fluid medium in said shear spaces.

9. A vicous fluid clutch comprising first and second relatively rotatable drive members, said first drive member having an annular working chamber formed therein, said second drive member being mounted in said working chamber and providing shear spaces adjacent opposite sides thereof, said shear spaces being operable with a fluid medium to provide a fluid shear drive relationship between said first and second drive members, an annular tubular member forming a reservoir chamber and being spaced apart from the outer peripheral portion of said shear spaces, at least one conduit serving to support said annular tubular member and to communicate said fluid medium between said outer peripheral portion of said shear spaces and said reservoir chamber for causing said fluid medium to vary its inner annular level in said shear spaces as a result of expanding and contracting due to changes in ambient temperature around said annular tubular member, thereby varying the speed of said first drive member with respect to the speed of said second drive member, and an annular solid member mounted within said reservoir chamber, said annular solid member being adapted to expand and contract in response to changes in said ambient temperature to affect the volume of said fluid medium in said reservoir chamber to further vary the variation of said inner annular level of said fluid medium in said shear spaces.

* * * * *